(12) United States Patent
Sivertsen

(10) Patent No.: US 7,362,566 B1
(45) Date of Patent: Apr. 22, 2008

(54) EXTERNAL REMOVABLE HARD DISK DRIVE SYSTEM

(75) Inventor: Clas Gerhard Sivertsen, Lilburn, GA (US)

(73) Assignee: American Megatrends, Inc., Norcross, GA (US)

(\*) Notice: Subject to any disclaimer, the term of this patent is extended or adjusted under 35 U.S.C. 154(b) by 0 days.

(21) Appl. No.: 11/563,874

(22) Filed: Nov. 28, 2006

(51) Int. Cl.
  *G06F 1/16* (2006.01)
(52) U.S. Cl. .............. 361/685; 248/638; 360/97.01; 312/223.2; 710/316
(58) Field of Classification Search .......... 248/634, 248/638, 636; 360/97.01, 137; 435/7.1; 312/223.1–223.6; 710/316
  See application file for complete search history.

(56) References Cited

U.S. PATENT DOCUMENTS 6,373,696 B1 * 4/2002 Bolognia et al. .......... 361/687
6,424,526 B1 * 7/2002 Heard .................. 361/687
7,216,195 B1 * 5/2007 Brown et al. .............. 710/316

\* cited by examiner

*Primary Examiner*—Hung Van Duong
(74) *Attorney, Agent, or Firm*—Hope Baldauff Hartman LLC

(57) ABSTRACT

A system and apparatus are described for removably mounting one or more hard disk drives within a computer system. According to one embodiment, the system includes an enclosure configured to receive a disk drive carrier cage, a disk drive backplane, a disk drive controller, and a power supply. The system also includes a disk drive backplane for receiving hard disk drives, disk drive carriers for holding the hard disk drives, and disk drive carrier rails mountable within the disk drive carrier cage for slidably receiving the disk drive carriers. The disk drive carriers and disk drive carrier rails are translucent thereby permitting light emanating from the backplane to be viewed at the front of the cage. The disk drive controller provides a disk drive interface between the disk drive backplane and a host computer system.

20 Claims, 19 Drawing Sheets

EXTERNAL REMOVABLE HARD DISK DRIVE SYSTEM

BACKGROUND

Computer system cases come in a wide variety of sizes and shapes. Typical case form factors include desktop and tower cases. Cases such as these typically offer some capacity for expansion. In particular, many cases include three or more 5.25 inch drive bays. Typically, these bays are utilized to hold optical mass storage devices, such as compact disk ("CD") read-only memory ("CD-ROM") devices, digital versatile disc ("DVD") devices, CD or DVD recording devices (such as CD-R or DVD-R devices), or other types of optical mass storage devices.

In the past, computer systems have often been configured with multiple optical mass storage devices. For instance, a computer may be configured with a CD-ROM drive, a DVD playback drive, and a CD or DVD recording device. However, with the advent of multifunction optical mass storage devices, the need for multiple devices has generally been eliminated. As an example, where it was once necessary to include both a recordable CD device and a DVD playback device, a single multifunction device can today provide both DVD playback and CD/DVD recording. Other types of multifunction optical mass storage devices provide additional multifunction features.

As a result of the common use of multifunction optical mass storage devices, many computers now include two or more unused 5.25 inch drive bays. These bays are typically unsuited for holding storage devices that are not specifically intended to be utilized within a 5.25 inch device form factor. As an example, it is generally difficult to utilize hard disk storage devices not specifically designed for use within a 5.25 inch device form factor, such as 2.5 inch hard disk drives, within the space previously utilized for 5.25 inch optical mass storage devices.

In other computer systems, no drive bays may be available for expansion. In order to expand the storage capacity of such computer systems, it is frequently necessary to utilize mass storage devices mounted within an external enclosure. However, currently available external enclosures provide limited functionality for connecting to high speed interfaces, such as the peripheral component interconnect express ("PCIe") mass storage interface. Currently available external enclosures also provide limited or no functionality for viewing the status of the mass storage devices mounted therein.

It is with respect to these considerations and others that the various embodiments described herein have been made.

SUMMARY

In accordance with the embodiments presented herein, the above and other considerations are addressed by systems and apparatuses for removably mounting one or more hard disk drives in an enclosure that is external to the host computer system. According to one embodiment provided herein, a system is provided for removably mounting one or more hard disk drives in an external enclosure. In one embodiment, the system includes a disk drive carrier cage configured for removably mounting a disk drive backplane and disk drive carrier rails. The disk drive carrier cage may be formed from a single piece of metal or other suitably strong and rigid material. The disk drive carrier cage is mountable within an enclosure. The enclosure may be constructed from metal, plastic, or other suitable rigid and strong material.

According to implementations, the system further includes a disk drive backplane mountable within the disk drive carrier cage. The disk drive backplane includes disk drive connectors, such as serial advanced technology attachment ("SATA") connectors or serial attached SCSI ("SAS"), for interfacing with compatible connectors on hard disk drives removably mounted along the disk drive carrier rails in disk drive carriers. According to one implementation, the disk drive backplane further includes status indicator lights, such as light emitting diodes ("LEDs"), for providing the location of a disk drive installed within the disk drive carrier cage. The status indicator lights corresponds to and are located adjacent to a disk drive connector.

According to implementations, the disk drive carrier cage includes a top, bottom, rear, first side, and second side. The disk drive backplane includes a front side on which the disk drive connectors are mounted and a back side having one or more ports mounted thereon. The disk drive backplane is mountable within the disk drive carrier cage by attaching the disk drive backplane to the rear of the disk drive carrier cage. The disk drive carrier cage is mountable to the enclosure by inserting screws or other fasteners through mounting channels present on the first and second sides of the cage.

According to other aspects, the back of the disk drive carrier cage includes one or more apertures corresponding to the ports mounted on the back side of the drive carrier backplane. When the disk drive backplane is mounted within the disk drive carrier cage, the ports protrude through the apertures in the disk drive carrier cage. The ports mounted on the back side of the disk drive backplane may include power input ports for receiving direct current ("DC") to power the operation of the disk drive backplane and any hard disk drives connected thereto. The ports may also include one or more global output indicator ports for driving external indicator lights when any hard disk drive connected to the disk drive backplane is active or has failed.

According to other aspects of the system, a translucent disk drive carrier is provided for receiving a hard disk drive. The disk drive carrier is configured for mounting within the disk drive carrier cage along disk drive carrier rails installed in the disk drive carrier cage. The disk drive carrier is constructed from a light transmissive material, such as translucent polycarbonate ABS plastic or acrylic polymer, and has a top, bottom, and a side. When a disk drive carrier is inserted into the disk drive carrier cage, light transmitted by the status indicator lights on the disk drive backplane is transmitted through the disk drive carrier from the backplane to the front of the disk drive carrier. According to one implementation, the disk drive backplane includes light emitting devices for transmitting light along the top of each disk drive carrier along with light emitting devices for transmitting light along the bottom of each disk drive carrier. One light may be utilized to indicate the activity of a hard disk drive within the carrier while another light may be utilized to indicate the failure of the hard disk drive within the carrier.

According to other implementations, the system further includes two or more translucent disk drive carrier rails that are removably mountable along a top or bottom of the disk drive carrier cage for receiving the disk drive carriers. The disk drive carrier rails include an aperture for receiving a locking tab on the disk drive carrier cage. The disk drive carrier rails also include two or more locking protrusions that are inserted into locking apertures in the disk drive carrier cage. Through the use of the locking tab and locking protrusions, the disk drive carrier rails may be removably attached to the disk drive carrier cage without the use of screws or other fasteners.

In one implementation, the disk drive carrier rails are constructed from a light transmissive material and have a front, back, and side surfaces. The disk drive carrier rails are symmetric so that they may be installed along the top or bottom of the disk drive carrier cage. In one implementation, the disk drive backplane further includes light emitting devices for transmitting light from the disk drive backplane to the front surface of the disk drive carrier rails when installed in the disk drive carrier cage. For instance, disk drive carrier rails may be mounted along the top of the disk drive carrier cage and along the bottom of the disk drive carrier cage. Lights on the disk drive backplane can be illuminated to enable quick identification of the corresponding location within the disk drive carrier cage even when a disk drive carrier is not present.

According to other aspects, the disk drive carriers further include one or more latching members. The latching members are spring-loaded and mounted at the top front and top bottom of the disk drive carriers. The latching members are operative to rotate between a latched position and an unlatched position. In the unlatched position, the disk drive carrier may be freely inserted or removed from the disk drive carrier cage along the disk drive carrier rails. In the latched position, one end of the latching member protrudes through an aperture in the drive carrier cage, thereby locking the disk drive carrier into the disk drive carrier cage. The latching members are symmetrical so that the same member may be utilized in a top or bottom position on the disk drive carriers.

According to other aspects, the disk drive carrier includes locking nubs positioned at locations corresponding to the locations of the mounting screw holes in a hard disk drive. When a hard disk drive is inserted into the disk drive carrier, the locking nubs protrude into the mounting screw holes of the disk drive thereby securing the hard disk drive in the disk drive carrier without the use of screws or other fasteners.

According to another implementation, the disk drive carrier cage and disk drive backplane are mounted within an external enclosure. A disk drive controller is also mounted within the enclosure. The disk drive controller is connected to the disk drive backplane and provides a disk drive interface to a host computer. For instance, in one implementation, the disk drive controller exposes a PCIe interface to a host computer. Other suitable interfaces may also be utilized, such as the universal serial bus ("USB") interface, a FIREWIRE interface, or other type of interface suitable for communicating with one or more mass storage devices. The enclosure may further include a power supply for powering the operation of the disk drive backplane, the disk drive controller, any hard disk drives connected to the disk drive backplane, and one or more fans for cooling the operation of the hard disk drives and other components.

These and various other features as well as advantages, which characterize the disclosure presented herein, will be apparent from a reading of the following detailed description and a review of the associated drawings.

DETAILED DESCRIPTION

Figure 1:
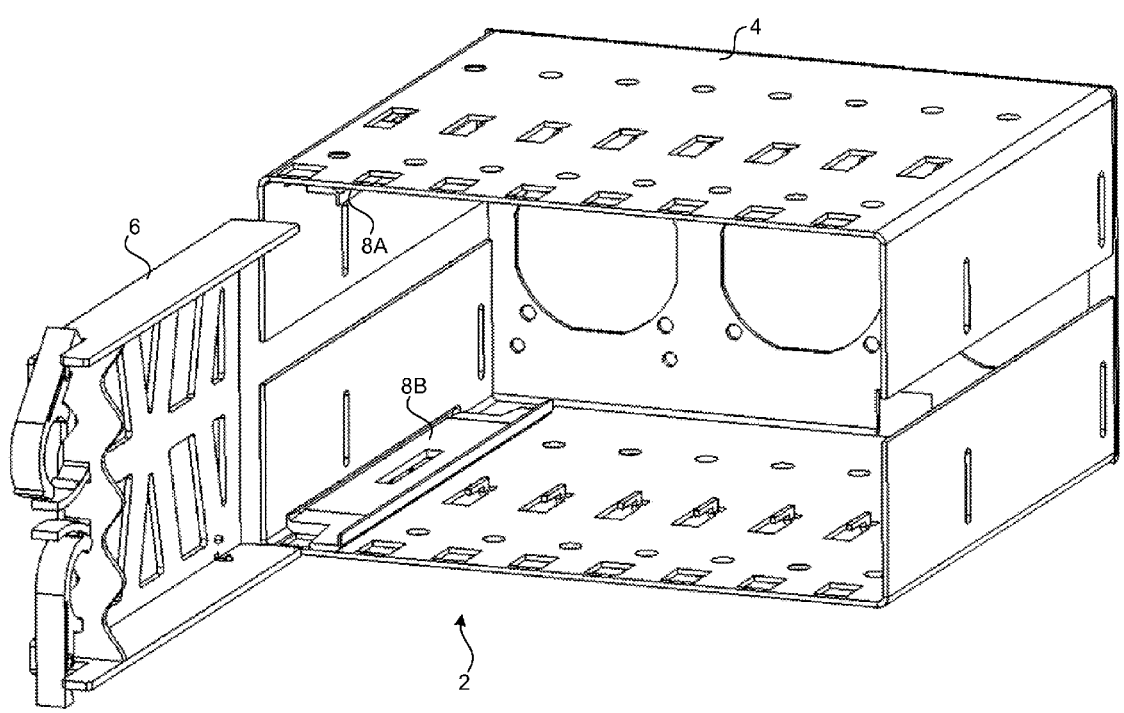
FIG. 1 is a perspective view of a system for removably mounting one or more hard disk drives within a computer system provided in one embodiment described herein.

Embodiments described herein provide apparatus and systems for removably mounting mass storage devices within a computer system. In the following detailed description, references are made to the accompanying drawings that form a part hereof, and in which are shown by way of illustration specific embodiments or examples. Referring now to the drawings, in which like numerals represent like elements throughout the several figures, several illustrative implementations will be described.

FIG. 1 shows a perspective view of a system for removably mounting one or more hard disk drives within a computer system. In particular, according to one implementation, the system 2 includes a disk drive carrier cage 4, one or more disk drive carriers 6 each capable of holding a single hard disk drive, and as many as sixteen disk drive carrier rails 8. As illustrated in FIG. 1, the disk drive carrier rails 8 are mountable within the disk drive carrier cage 4. When inserted therein, the disk drive carrier rails 8 allow a disk drive carrier 6 to be slid into and out of the disk drive carrier cage 4.

FIG. 1 illustrates only one disk drive carrier 6 and only two disk drive carrier rails 8A and 8B. However, it should be appreciated that as many as eight disk drives may be mounted within the disk drive carrier cage 4 through the use of additional disk drive carriers 6 and disk drive carrier rails 8. Additional details regarding the disk drive carrier cage 4 will be provided below with respect to FIGS. 2-4. Additional details regarding the disk drive carrier 6 and disk drive carrier rails 8 will be provided below with respect to FIGS. 5-11.

Figure 2A:
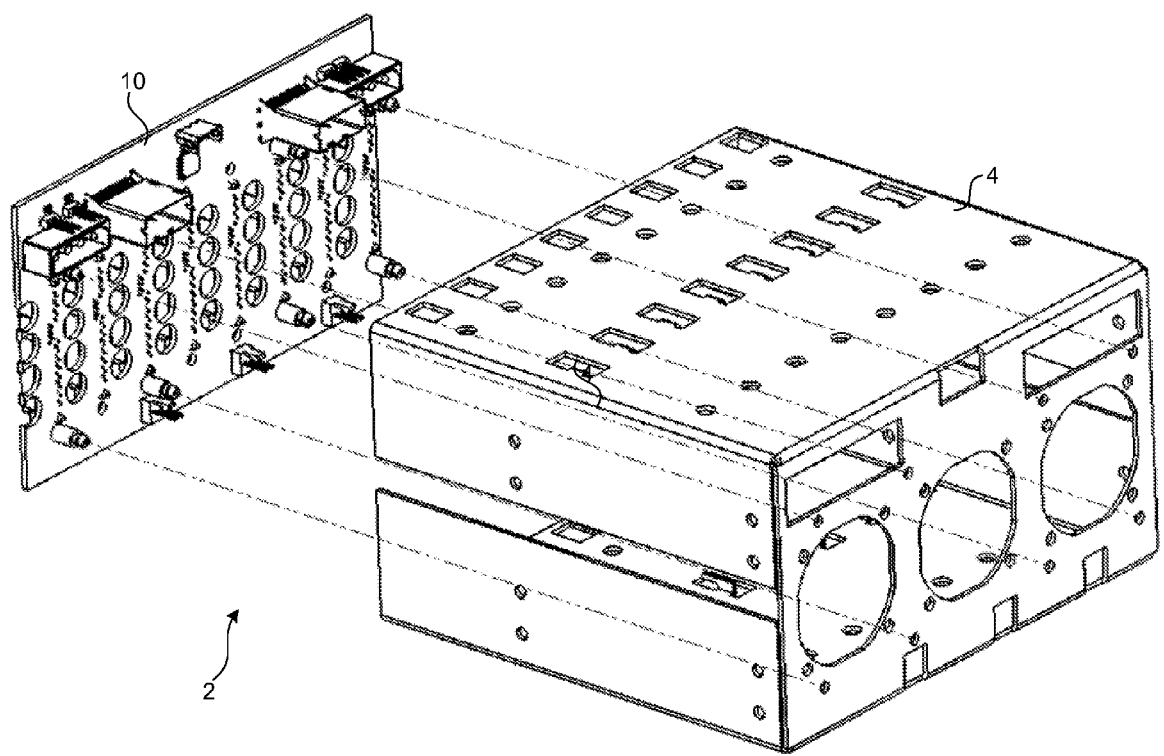
FIGS. 2A-2B are perspective views of a disk drive carrier cage and a disk drive backplane provided in one implementation described herein.
Figure 2B:
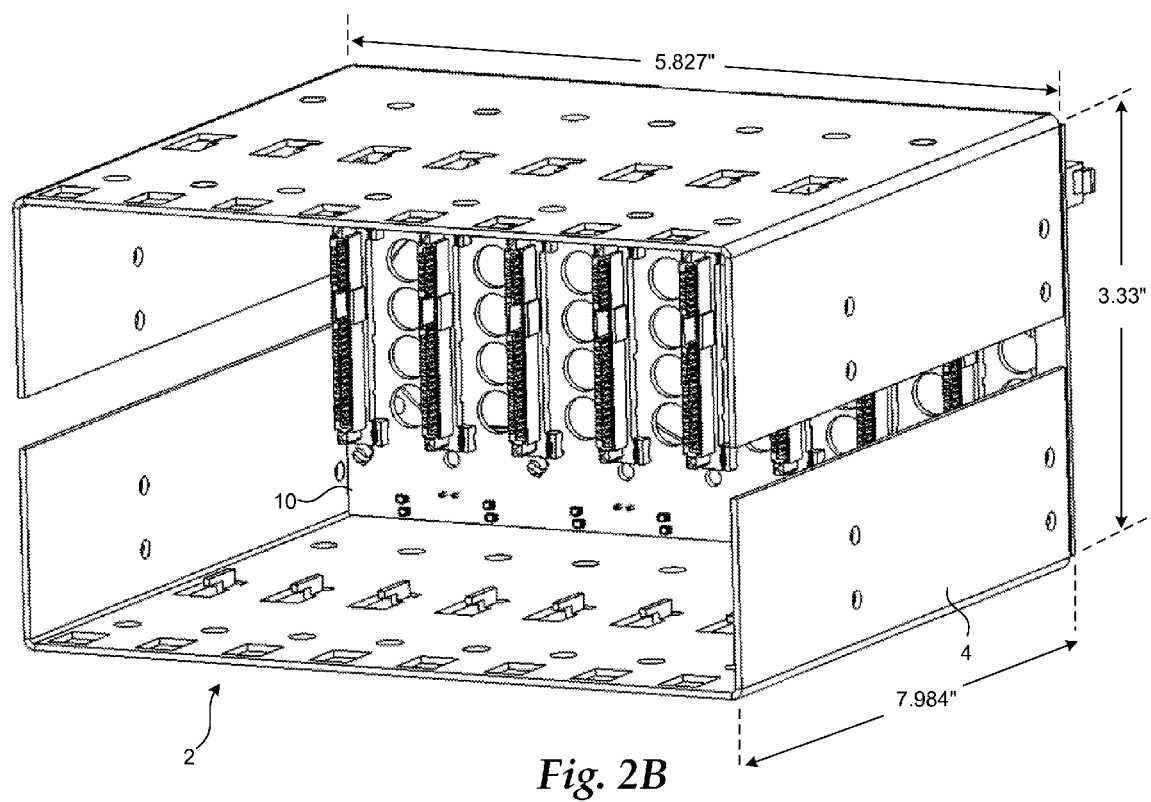

FIGS. 2A-2B are perspective views of the disk drive carrier cage 4 and a disk drive backplane 10 that also forms a part of the system 2 in one embodiment. As shown in FIG. 2A and described in greater detail herein, the disk drive backplane 10 is mountable within the disk drive carrier cage 4. When mounted within the disk drive carrier cage 4, the disk drive backplane 10 is operative to connect to and interface with hard disk drives mounted within the disk drive carrier cage 4. The disk drive backplane 10 also provides power to the connected hard disk drives, provides an interface for communicating management information regarding the hard disk drives, and performs other functions as described herein. Additional details regarding the structure and operation of the disk drive backplane 10 will be provided below with respect to FIGS. 12-15.

As illustrated in FIG. 2B, in one embodiment, the disk drive carrier cage 4 is sized for mounting within a drive bay sized to receive two 5.25 inch form factor optical mass storage devices. The size of such 5.25 inch optical mass storage devices is governed by the Small Form Factor ("SFF") Committee and is described in specification SFF-8551, which is publicly available from the SFF Committee.

The SFF-8551 specification indicates that the dimensions of a single 5.25 inch optical mass storage device are 5.827 inches in width, 7.984 inches in depth, and 1.665 inches in height. Accordingly, in one implementation described herein, the dimensions of the disk drive carrier cage 4 are substantially equivalent to 5.827 inches in width, 7.984 inches in depth, and 3.33 inches in height. In this manner, the disk drive carrier cage 4 can be installed in a drive bay capable of holding two 5.25 inch form factor optical mass storage devices. It should be appreciated, however, that many of the features described herein are not dependent on the size of the disk drive carrier cage 4. These features, of course, may be utilized with disk drive carrier cages of other sizes and with other types of removable disk drive systems. Additional details regarding the structure and features of the disk drive carrier cage 4 are provided below with reference to FIG. 3.

Figure 3:
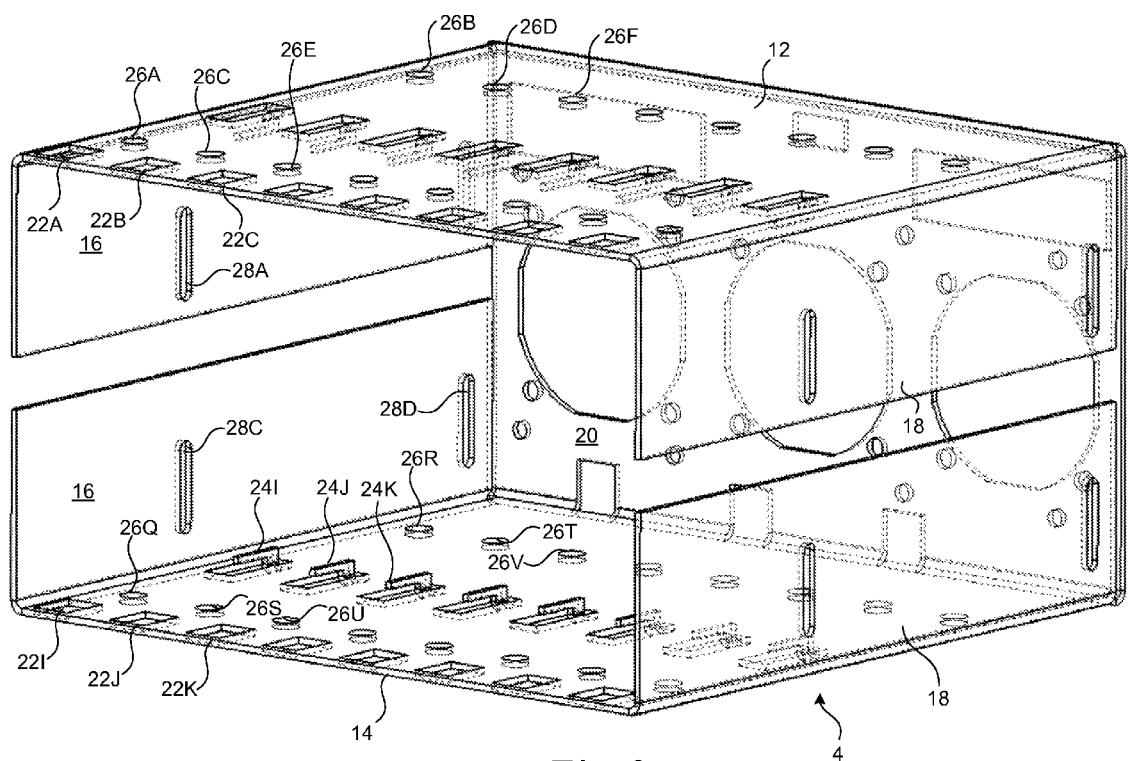
FIG. 3 is a perspective view of a disk drive carrier cage provided in one implementation described herein.

FIG. 3 is a perspective view of a disk drive carrier cage 4 provided in one implementation described herein. The disk drive carrier cage 4 includes a top 12, bottom 14, sides 16 and 18, and a back 20. As will be described in greater detail below with reference to FIG. 4, the disk drive carrier cage 4 may be constructed from a single piece of metal or other suitably strong and rigid material. According to one implementation, the disk drive carrier cage 4 includes features that allow the disk drive carrier rails 8 to be mounted within the disk drive carrier cage 4 without the use of screws or other fasteners. In particular, the disk drive carrier cage 4 includes locking tabs that correspond to apertures on the disk drive carrier rails 8. A locking tab is provided for each position within the disk drive carrier cage 4 in which a disk drive carrier 6 may be mounted. For instance, the locking tabs 24I-24K correspond to the first three positions within the disk drive carrier cage 4 for which drive carriers 6 may be placed. For each locking tab, two locking apertures 26 are also provided.

When a disk drive carrier rail 8 is placed in the disk drive carrier cage 4, protrusions on the disk drive carrier rail 8 mate with the locking apertures 26. At the same time, the corresponding locking tab 24 is placed through the locking aperture on the disk drive carrier rail 8. In this manner, the locking tab 24 and the protrusions on the disk drive carrier rail 8 provide opposing forces that hold the disk drive carrier rail 8 in the disk drive carrier cage 4 without the use of screws or other fasteners. It should be appreciated that a sufficient number of locking tabs 24 and locking apertures 26 are provided on the top 12 and bottom 14 of the disk drive carrier cage to allow up to eight pair of disk drive carrier rails 8 to be mounted within the disk drive carrier cage 4. Additional details regarding the structure of the disk drive carrier rails 8 are provided below with respect to FIGS. 6A-6B.

As also shown in FIG. 3, the sides 16 and 18 of the disk drive carrier cage 4 include mounting channels 28 through which a screw or other type of fastener may be inserted to thereby mount the disk drive carrier cage 4 to a suitable case. The disk drive carrier cage 4 also includes two carrier locking apertures 22 for each position within the cage 4 at which a disk drive carrier 6 may be inserted. As will be discussed in greater detail below, each disk drive carrier 6 includes one or more latching members. When placed in a latched position, the latching members protrude through the carrier locking apertures 22 thereby locking the disk drive carrier 6 within the disk drive carrier cage 4. When placed in an unlatched position, the latching members do not protrude through the carrier locking apertures 22 thereby allowing the disk drive carrier 6 to be freely removed or inserted from the disk drive carrier cage 4. Additional details regarding the structure and use of the disk drive carriers 6 and the latching members will be provided below with respect to FIGS. 5-9.

Figure 4:
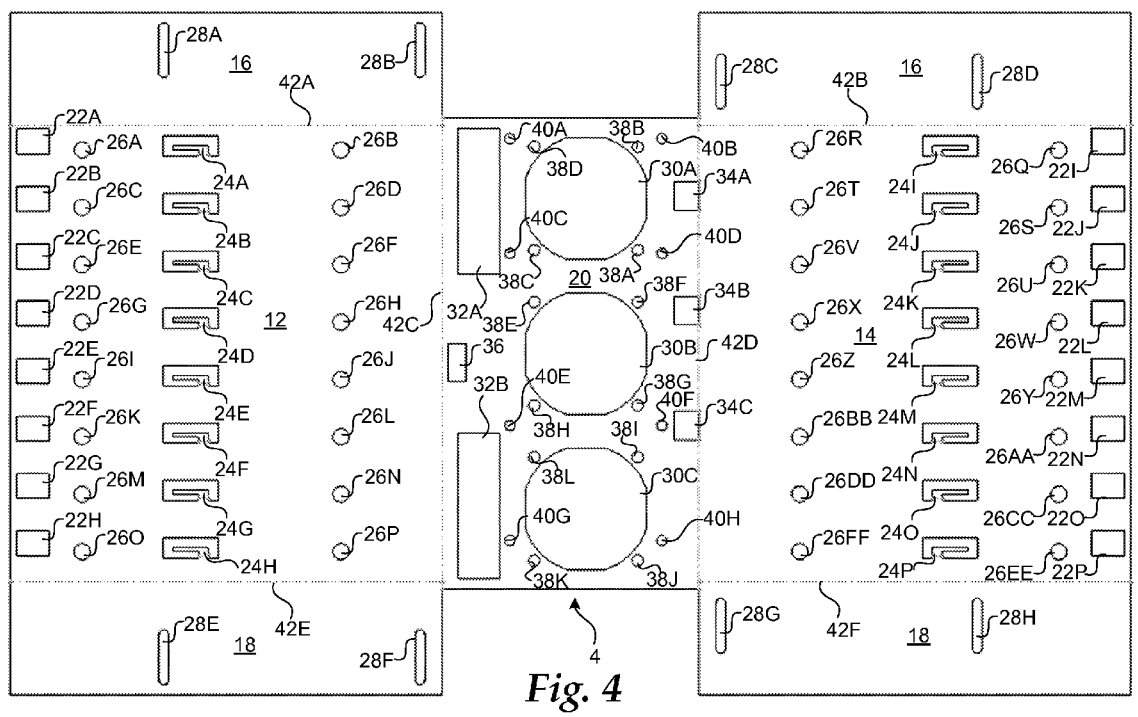
FIG. 4 is a metal stamping diagram illustrating a pattern for forming a disk drive carrier cage as provided in one implementation described herein.

FIG. 4 is a metal stamping diagram illustrating a pattern for forming a disk drive carrier cage 4 as provided in one implementation described herein. As illustrated in FIG. 4, the disk drive carrier cage 4 may be constructed from a single piece of metal or other sufficiently strong and rigid material. The view shown in FIG. 4 is of a single piece of metal that has been stamped to form the various features of the disk drive carrier cage 4. The score lines 42A-42F indicate the locations at which the metal should be bent to form the disk drive carrier cage 4 as illustrated in FIGS. 1-3.

In one implementation, the disk drive carrier cage 4 includes cutouts for forming the carrier locking apertures 22A-22P, the locking tabs 24A-24P, the locking apertures 26A-26EE, and the mounting channels 28A-28H. Cutouts are also provided for forming the airflow apertures 30A-30C. The airflow apertures 30A-30C allow air to pass through the rear 20 of the disk drive carrier cage 4 to cool hard disk drives mounted within the disk drive carrier cage 4.

Cutouts may also be provided within the disk drive carrier cage 4 for forming the power and data apertures 32A-32B. The power and data apertures permit power headers and host data ports on the disk drive backplane 10 to pass through the rear 20 of the disk drive carrier cage 4. A cutout is also provided on the rear 20 of the disk drive carrier cage 4 for forming an aperture 36 through which an IPMI header on the disk drive backplane 10 may pass.

Cutouts may also be provided for forming the fan power header apertures 34A-34C. These apertures allow fan power headers provided on the disk drive backplane 10 to pass through the rear 20 of the disk dive carrier cage 4. The fan power headers provide DC power to one or more fans attached to the rear 20 of the disk drive carrier cage 4. The rear 20 of the disk drive carrier cage 4 also includes the fan mounting apertures 38A-38K for receiving a fastener through which the fans are attached to the rear 20 of the disk drive carrier cage 4. The apertures 40A-40G are for receiving a fastener to affix the disk drive backplane 10 to the rear 20 of the disk drive carrier cage 4. According to implementations, locking standoffs are utilized to affix the fans and the disk drive backplane 10 to the rear 20 of the disk drive carrier cage 4. In this manner, no screws are required to assemble the system shown in FIGS. 1-2B.

Figure 5:
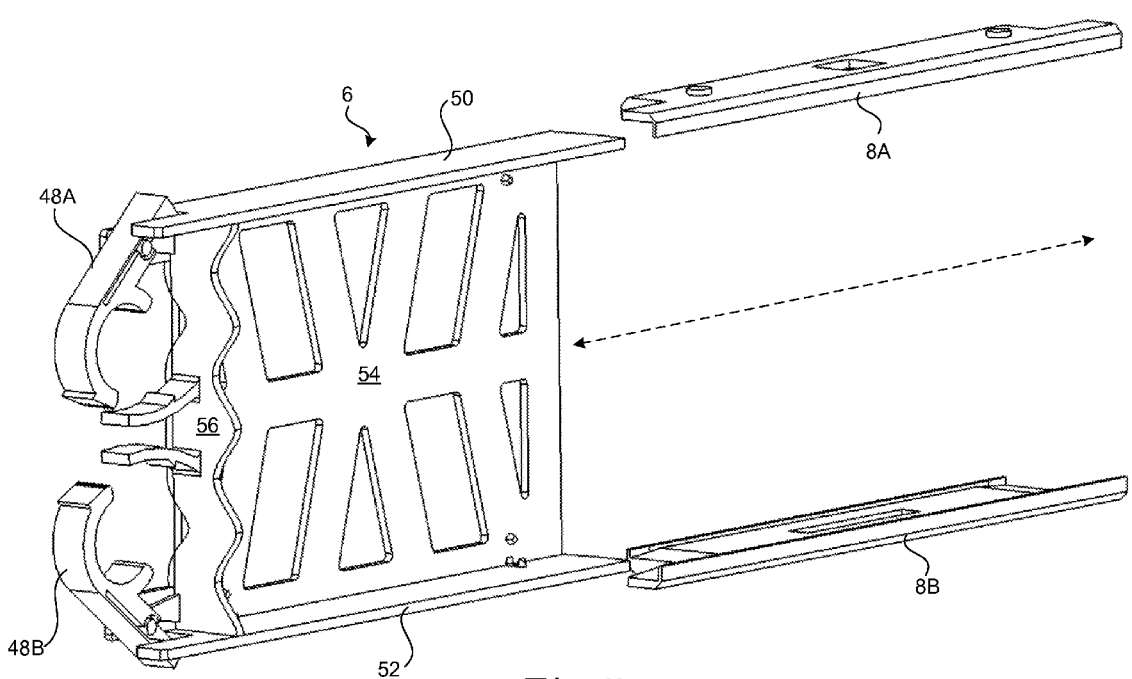
FIG. 5 is a perspective view showing a disk drive carrier and disk drive carrier rails provided in one implementation described herein.

FIG. 5 is a perspective view showing a disk drive carrier 6 and disk drive carrier rails 8A-8B provided in one implementation described herein. As shown in this FIGURE, the disk drive carrier rails 8A-8B are configured to receive the disk drive carrier 6. In particular, when the disk drive carrier rails 8A-8B are mounted in the disk drive carrier cage 4 as described herein, the disk drive carrier 6 may be slidably inserted into and removed from the disk drive carrier cage 4. An edge of the disk drive carrier rails 8A-8B maintains the disk drive carrier 6 in position and prevents lateral movement of the disk drive carrier 6.

As also shown in FIG. 5, the disk drive carrier 6 includes a top 50, bottom 52, side 54, and front 56. The disk drive carrier rails 8A-8B are configured to receive either the top 50 or bottom 52 of the disk drive carrier 6. As will be described in greater detail below, the disk drive carrier 6 includes two latching members 48A-48B that may be rotated between a latched and an unlatched position. In the latched position, one end of the latching members 48A-48B protrudes through an aperture in the disk drive carrier cage 4 thereby locking the disk drive carrier 6 into the disk drive carrier cage 4. In the unlatched position, the disk drive carrier 6 is permitted to freely slide between the disk drive carrier rails 8A-8B for removal or insertion into the disk drive carrier cage 4. Additional details regarding the disk drive carrier rails 8A-8B are provided below with respect to FIG. 6. Additional details regarding the structure and operation of the latching members 48A-48B are provided below with respect to FIGS. 7-9.

In one implementation, the disk drive carrier 6 is sized to receive a hard disk drive having a 2.5 inch form factor. In particular, in an implementation, 2.5 inch SAS hard disk drives may be utilized. The disk drive backplane 10 is also configured for use with 2.5 inch SAS hard disk drives. It should be appreciated, however, that other types of 2.5 inch disk drives may be utilized. In this manner, as many as eight hard disk drives may be mounted within the disk drive carrier cage 4 within the space of two 5.25 inch form factor optical mass storage devices.

As will be described in greater detail below, in one embodiment the disk drive carrier 6 is constructed from a light transmissive material, such as translucent polycarbonate ABS plastic or acrylic polymer. When a disk drive carrier 6 is inserted into the disk drive carrier cage 4, light transmitted by status indicator lights on the disk drive backplane 10 is transmitted through the disk drive carrier 6 from the backplane 10 to the front of the disk drive carrier 6. According to one implementation, the disk drive backplane 10 includes light emitting devices for transmitting light along the top 50 of each disk drive carrier 6 along with light emitting devices for transmitting light along the bottom 52 of each disk drive carrier 6. One light may be utilized to indicate the activity of a hard disk drive within the carrier 6 while another light may be utilized to indicate the failure of the hard disk drive within the carrier 6. Additional details regarding the structure and operation of the disk drive backplane 10 in this regard are provided below with respect to FIGS. 12-15.

Figure 6A:
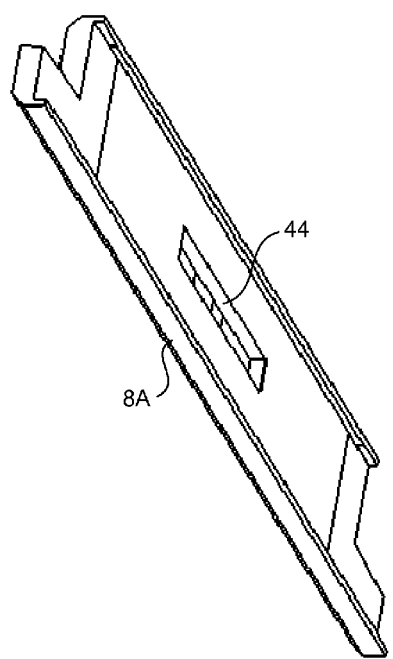
FIGS. 6A-6B are perspective diagrams illustrating aspects of a disk drive carrier rail provided in one implementation described herein.
Figure 6B:
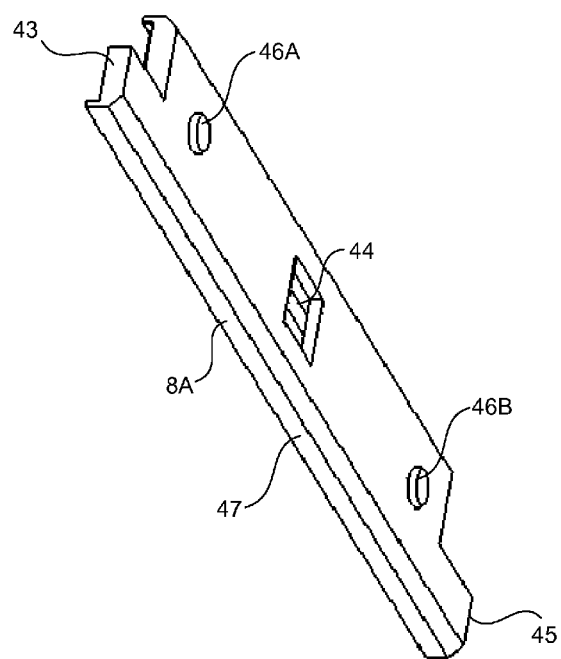

FIGS. 6A-6B are perspective diagrams illustrating aspects of a disk drive carrier rail 8A provided in one implementation provided herein. In particular, the disk drive carrier rail 8A includes a locking tab receiving aperture 44. As described briefly above, the locking tabs 24 of the disk drive carrier cage 4 are configured to protrude through the locking tab receiving aperture 44 when the disk drive carrier rail 8A is installed in the disk drive carrier cage 4.

As shown in FIGS. 6A-6B, the disk drive carrier rail 8A may further include multiple protrusions 46A-46B. The protrusions 46A-46B are spaced to coincide with the locking apertures 26 of the disk drive carrier cage 4. When the disk drive carrier rail 8A is installed in the disk drive carrier cage 4, the protrusions 46A-46B pass into the appropriate locking apertures 26 of the disk drive carrier cage 4. Through the use of the locking tabs 24 and locking protrusions 46, the disk drive carrier rail 8A may be secured to the disk drive carrier cage 4 without the use of screws or any other fasteners. It should be appreciated that the disk drive carrier rail 8A is symmetrical so that the same rail may be installed along the top or bottom of the disk drive carrier cage 4.

In one implementation, the disk drive carrier rail 8A is constructed from a light transmissive material and has a front 43, a back 45, and a side 47. The light transmissive material may comprise translucent polycarbonate ABS plastic, acrylic polymer, or similar material that provides sufficient strength while allowing the disk drive carrier rail 8A to remain translucent.

As will be described in greater detail below, in one implementation the disk drive backplane 10 includes light emitting devices for transmitting light from the disk drive backplane 10 to the front 43 of the disk drive carrier rail 8A when installed in the disk drive carrier cage 4. For instance, disk drive carrier rails 8 may be mounted along the top of the disk drive carrier cage 4 and also along the bottom of the disk drive carrier cage 4. Lights on the disk drive backplane 10 can be illuminated to enable quick identification of the corresponding location within the disk drive carrier cage 4 even when a disk drive carrier 6 is not present. Additional details in this regard will be provided below with reference to FIGS. 12-15.

Figure 7:
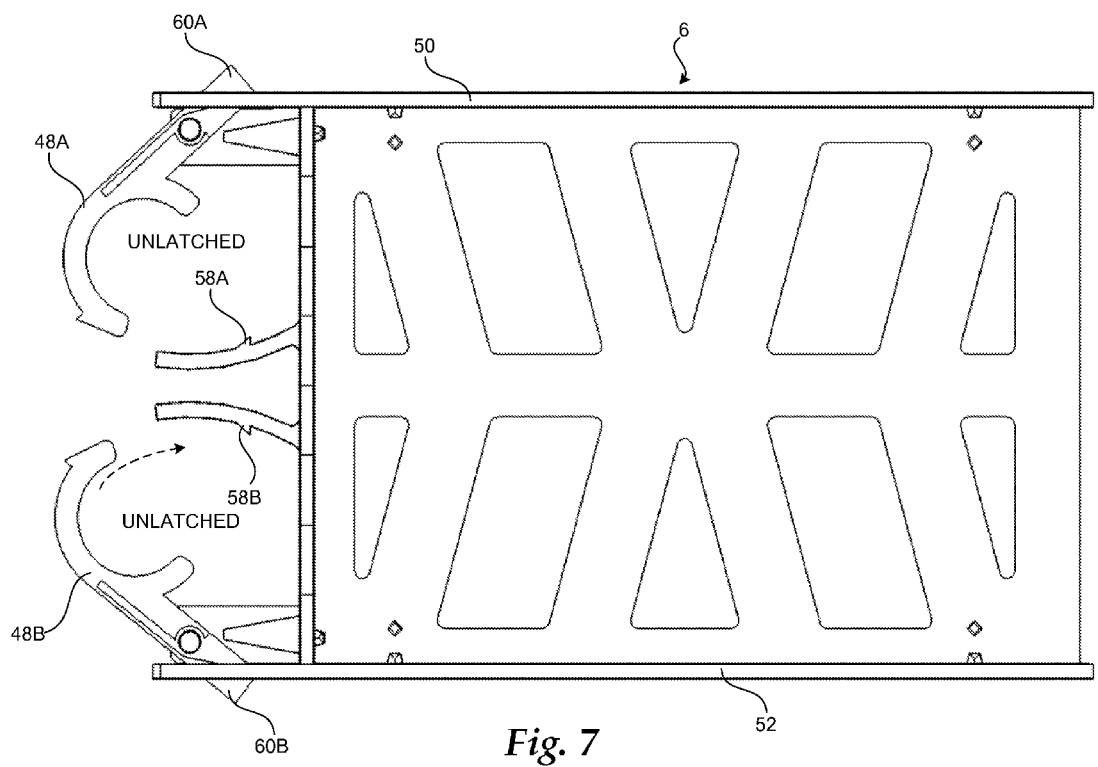
FIGS. 7-8 are two-dimensional side views of a disk drive carrier provided in one implementation described herein.
Figure 8:
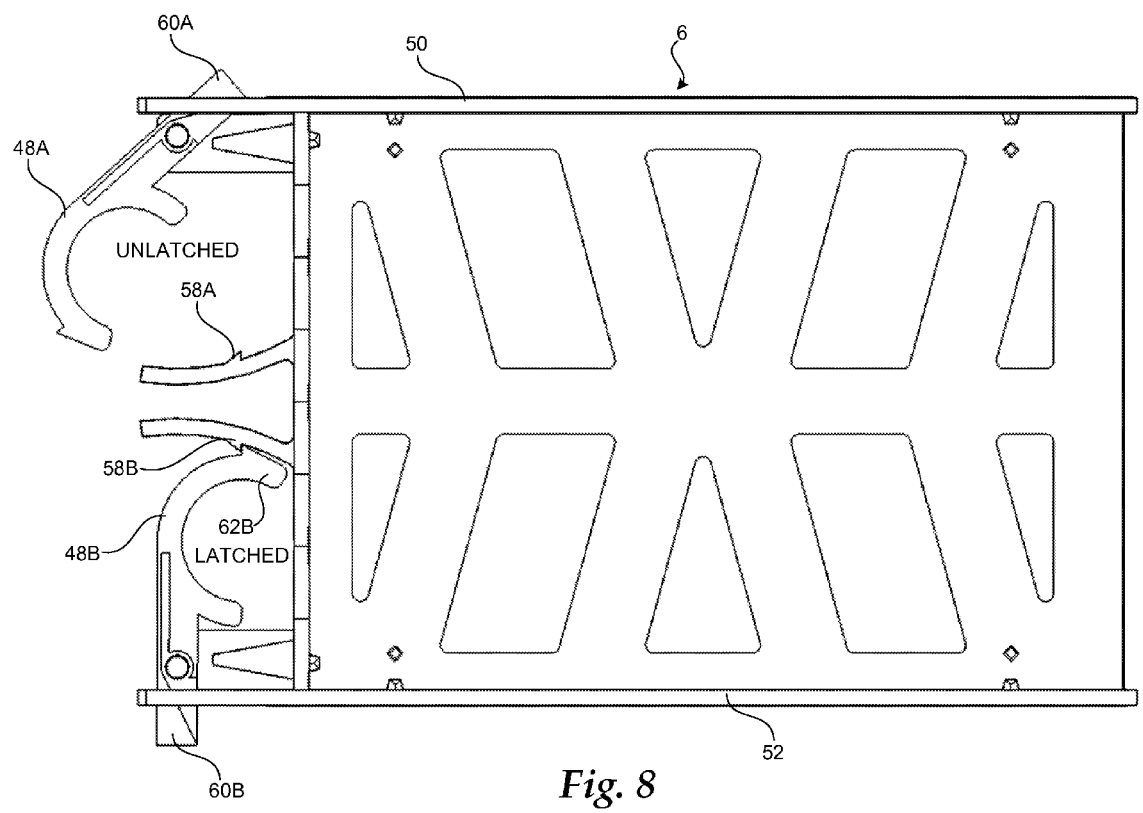

FIGS. 7 and 8 are two-dimensional side views of a disk drive carrier 6 provided in one implementation provided herein. Turning now to these figures, additional details regarding a mechanism for locking the disk drive carrier 6 into the disk drive carrier cage 4 will be described. In particular, as illustrated in FIG. 8, the disk drive carrier 6 includes two latching members 48A and 48B. The latching member 48A is pivotally attached at the top 50 of the disk drive carrier 6, while the latching member 48B is pivotally attached at the bottom 52 of the disk drive carrier 6.

As shown in FIG. 7, the front 56 of the disk drive carrier 6 further includes the latches 58A and 58B for mating with and thereby restraining the latching members 48A-48B. The latching members 48A and 48B may be rotated between a latched position and an unlatched position. In the latched position, shown in FIG. 8, a proximal end 62B of the member 48B mates with and is restrained by the latch 58B. In the latched position, a distal end 60B of the member 48B also protrudes through the locking aperture 26 of the disk drive carrier cage 4, thereby locking the disk drive carrier 6 into the cage 4. In a similar manner, the proximal end of the member 48A mates with and is restrained by the latch 58A in the latched position. In this position, the distal end 60A of the member 48A protrudes through a locking aperture in the disk drive carrier cage 4.

The latching member 48B may be removed from the latched position into the unlatched position by slightly moving the latch 58B in a direction away from the member 48B thereby releasing the member 48B. In the unlatched position, as shown in FIG. 7, the proximal end 62B of the latching member 48B does not engage the latch 58B. Additionally, in the unlatched position, the distal end 60B of the member 48B does not protrude through the locking aperture 26 of the disk drive carrier cage 4, thereby allowing the disk drive carrier 6 to be freely inserted into or removed from the disk drive carrier cage 4. The latching member 48A operates in a similar manner. It should be appreciated that the latching members 48A-48B are symmetrical thereby permitting installation and use at either the top or bottom of the disk drive carrier cage 6. Additional details regarding the construction of the latching members 48 are provided below with respect to FIG. 9.

Figure 9:
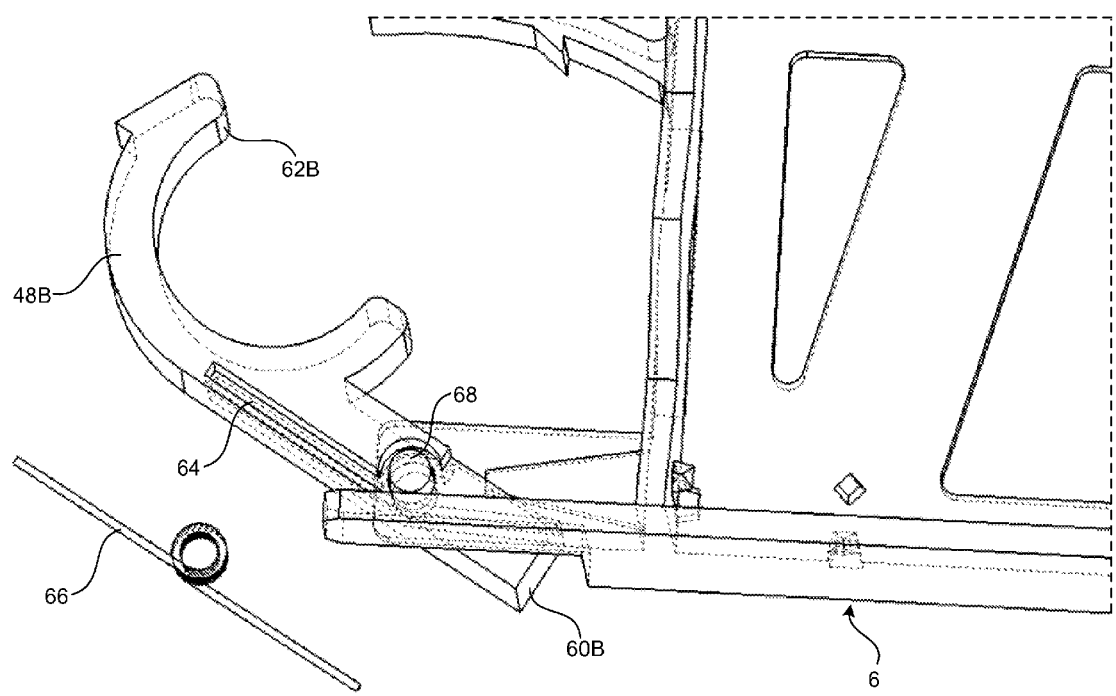
FIGS. 9-10 are perspective views illustrating aspects of a disk drive carrier provided in one implementation presented herein.

FIG. 9 is a perspective view showing additional aspects of a disk drive carrier 6 provided in one implementation presented herein. In particular, FIG. 9 illustrates additional aspects of the latching member 48B and its use in conjunction with the disk drive carrier 6. As shown in FIG. 9, the latching member 48B freely rotates between a latched and an unlatched position around a spindle 68. In one implementation, a channel 64 is provided in the latching member for receiving a spring 66. When installed, the spring 66 causes the latching member 48B to become spring-loaded and to remain in the unlatched position by default. The spring 66 also provides resistance when the member 48B is moved from the unlatched position to the latched position.

Figure 10:
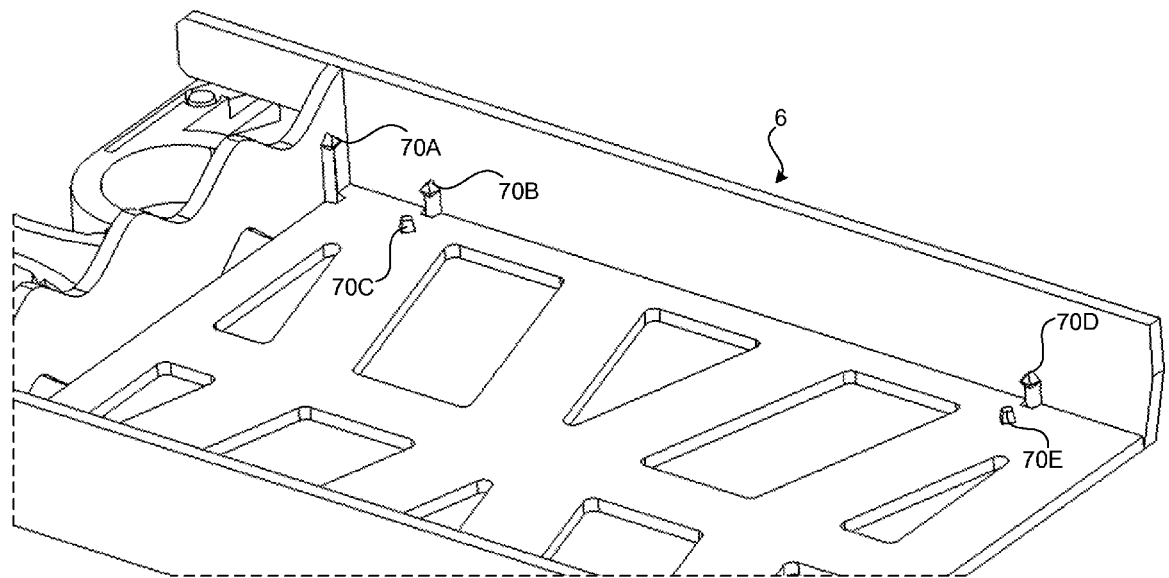
Figure 11:
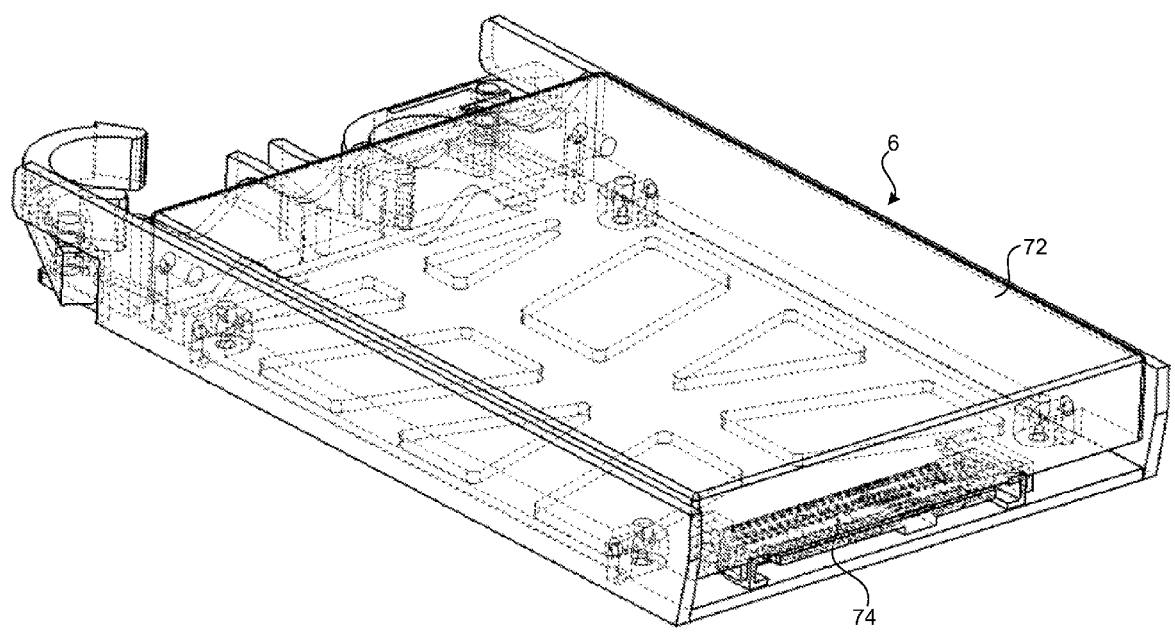
FIG. 11 is a perspective view showing a disk drive carrier provided herein with a hard disk drive storage device installed therein.

FIGS. 10-11 are perspective views showing additional details regarding a disk drive carrier 6 provided herein. In particular, FIG. 10 illustrates a mechanism utilized in one embodiment presented herein for restraining a hard disk drive within the disk drive carrier 6. In particular, this mechanism utilizes the locking nubs 70A-70E to restrain the hard disk drive without the use of screws or other fasteners.

In particular, in one implementation, the locking nubs 70A-70E are located on the top, bottom, and side of each disk drive carrier 6. The locking nubs 70A-70E are positioned at locations corresponding to the locations of mounting screw holes of a hard disk drive when the disk drive is inserted into the disk drive carrier 6. Because the disk drive carrier 6 is made of plastic, it may be flexed slightly in order to receive the hard disk drive. When the disk drive carrier 6 returns to its non-flexed state, the nubs 70A-70E protrude into the mounting screw holes of the hard disk drive thereby restraining the hard disk drive without the use of mounting screws. It should be appreciated that fewer or more locking nubs may be utilized and at different locations than those illustrated in FIG. 10.

FIG. 11 illustrates a hard disk drive 72 mounted within the disk drive carrier 6. As shown in FIG. 11, when installed within the carrier 6, the locking nubs protrude into the mounting screw holes on the hard disk drive 72 thereby securing the hard disk drive 72 within the carrier 6. As also shown in FIG. 11, a drive connector 74 on the hard disk drive 72 is accessible from the rear of the carrier 6 for mating with the disk drive backplane 10. Additional details regarding the disk drive backplane 10 are provided below with respect to FIGS. 12-13.

Figure 12:
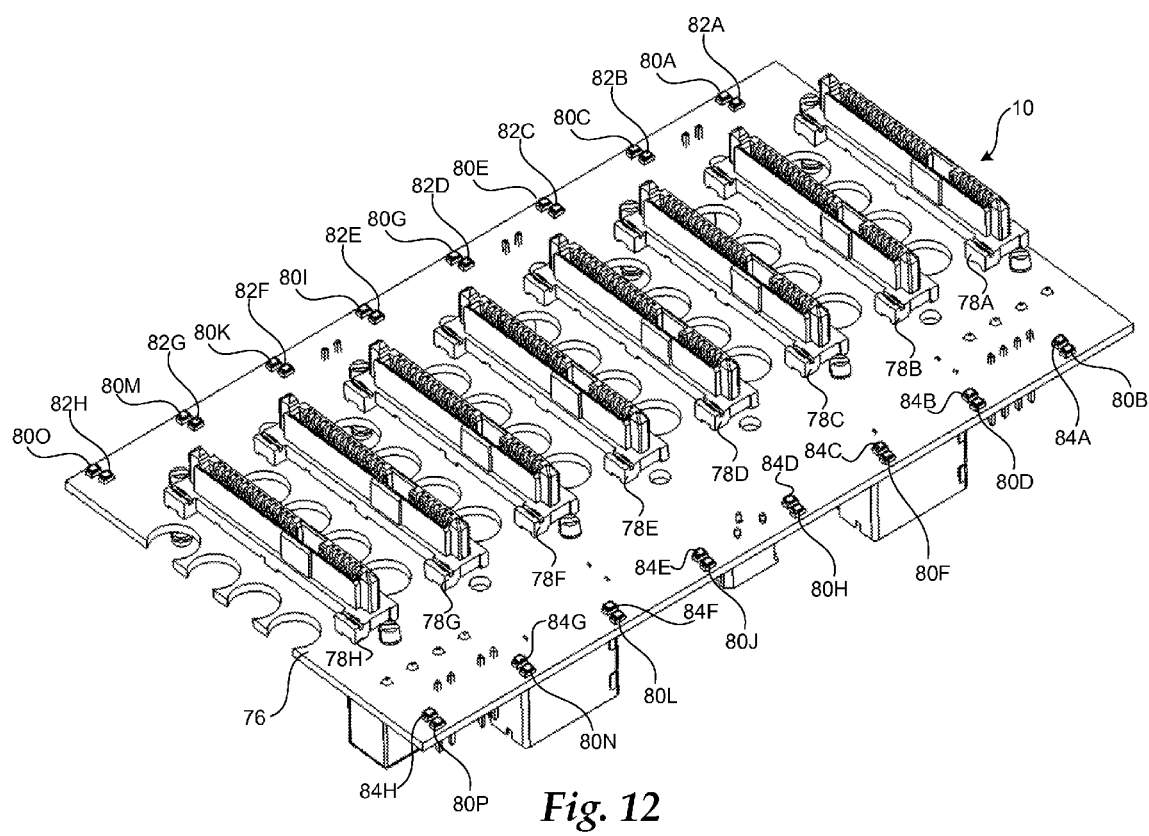
FIGS. 12-13 are perspective views showing a disk drive backplane as provided in one implementation described herein.
Figure 13:
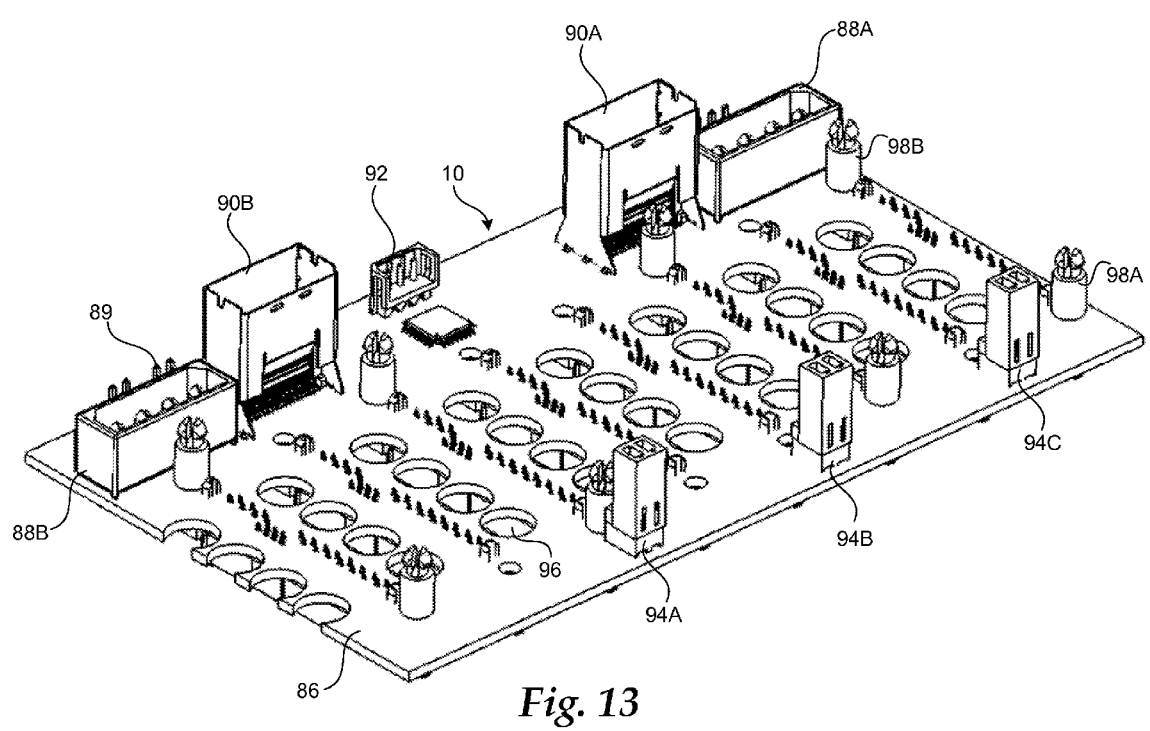

FIGS. 12-13 are perspective views showing a disk drive backplane 10 as provided in one implementation described herein. In particular, FIG. 12 shows a front side 76 of the disk drive backplane 10. Mounted on the front side 76 of the disk drive backplane 10 are eight disk drive connectors 78A-78H, such as SAS or SATA connectors, for interfacing with compatible connectors on hard disk drives removably mounted along the disk drive carrier rails 8 in disk drive carriers 6. Other types of disk drive connectors may also be utilized.

According to one implementation, the disk drive backplane 10 further includes status indicator lights, such as light emitting diodes ("LEDs"). The status indicator lights may be illuminated to show the location of a hard disk drive installed within the drive cage 4, to indicate the failure of a disk drive, or to indicate the activity of a disk drive. Each of the status indicator lights corresponds to and is located adjacent to a disk drive connector.

In one embodiment, the status indicator lights include two LEDs that are mounted on the disk drive backplane 10 adjacent to each disk drive connector. These LEDs are utilized to provide a visual indication of the location of a particular hard disk drive within the cage 4. These LEDs, referred to herein as "locate LEDs," are also mounted in such a manner that light emitted from these devices is directed through the disk drive carrier rails 8 installed in the cage 4. For instance, the locate LEDs 80A and 80B are located proximate to the drive connector 78A. When disk drive carrier rails are installed at locations in the cage 4 corresponding to the drive connector 78A and the LEDs 80A and 80B are illuminated, light emitted from the LEDs 80A and 80B is visible from the front of the disk drive carrier rails 8. In this manner, a visual indication may be provided regarding the location of the hard disk drive 6 contained within the carrier 6 without the use of an external light pipe. A visual indication regarding a location within the cage 4 can even be provided when no disk drive carrier 6 is installed at the location.

According to other embodiments, the disk drive backplane 10 further includes lights for indicating the activity and failure of a hard disk drive connected to the backplane 10. These lights, such as the "activity LEDs" 82A-82H and the "failure LEDs" 84A-84H are mounted in such a manner that light emitted from these devices is directed down the top 50 or bottom 52 of a disk drive carrier 6 when installed in the cage 4. For instance, the activity LED 82A is located proximate to the drive connector 78A. When a disk drive carrier 6 is installed at a location in the cage 4 corresponding to the drive connector 78A and the LED 82A is illuminated, light emitted from the LED 82A is visible from the front of the disk drive carrier 6. In this manner, a visual indication may be provided regarding the activity of the hard disk drive 6 contained within the carrier 6 without the use of an external light pipe. In a similar manner, light emanating from the failure LED 84A may be transmitted through the disk drive carrier 6 and observed from the front of the carrier. Additional details regarding the use of the disk drive carrier 6 in this manner are provided below with respect to FIGS. 14 and 15.

FIG. 13 shows the back side 86 of the disk drive backplane 10. The back side of the disk drive backplane 10 includes several ports. When the disk drive backplane 10 is mounted within the disk drive carrier cage 4, these ports protrude through the apertures in the disk drive carrier cage 4 described above. The ports mounted on the back side of the disk drive backplane may include power input ports 88A-88B for receiving DC to power the operation of the disk drive backplane 10 and any hard disk drives connected thereto. The ports may also include one or more global output indicator ports 89 for driving external indicator lights when any hard disk drive connected to the disk drive backplane is active or has failed.

The ports on the back of the disk drive backplane may further include an IPMI port 92 for communicating management data regarding the hard disk drives connected to the disk drive backplane 10. The ports may further include one or more host bus ports 90A-90B, such as an IPASS port, for connecting the disk drive backplane 10 and any hard disk drives connected thereto to a host computer. The IPASS port allows the use of a single cable to connect up to four SAS devices to a host computer. Accordingly, each IPASS port is electrically connected to four of the drive connectors on the disk drive backplane 10.

The ports may further include power output ports 94A-94C for supplying power to one or more fans attached to the drive carrier cage 4. The drive carrier cage 4 and drive carrier backplane 6 may include airflow apertures for permitting airflow generated by fans mounted to the back of the disk drive carrier cage 4 to pass through and to thereby cool the hard disk drives mounted within the disk drive carrier cage 4. As illustrated in FIG. 13, the disk drive backplane 10 may be affixed to the disk drive carrier cage 4 utilizing locking standoffs 98A-98B thereby eliminating the need for screws or other similar fasteners.

Figure 14:
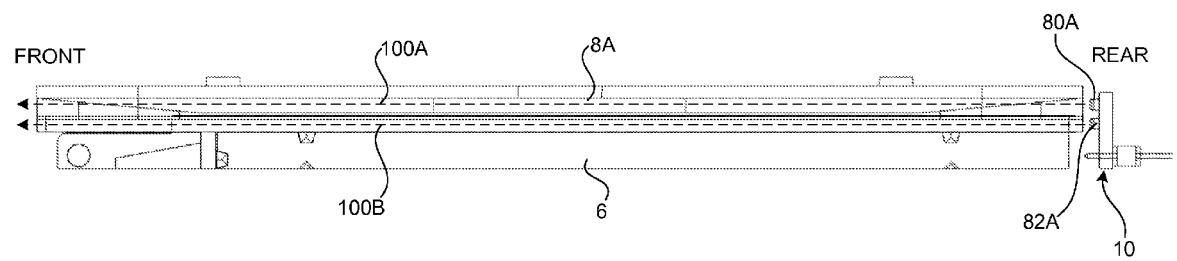
FIG. 14 is a cross-sectional view of a disk drive backplane, a disk drive carrier, and disk drive carrier rails as provided in one implementation described herein.
Figure 15:
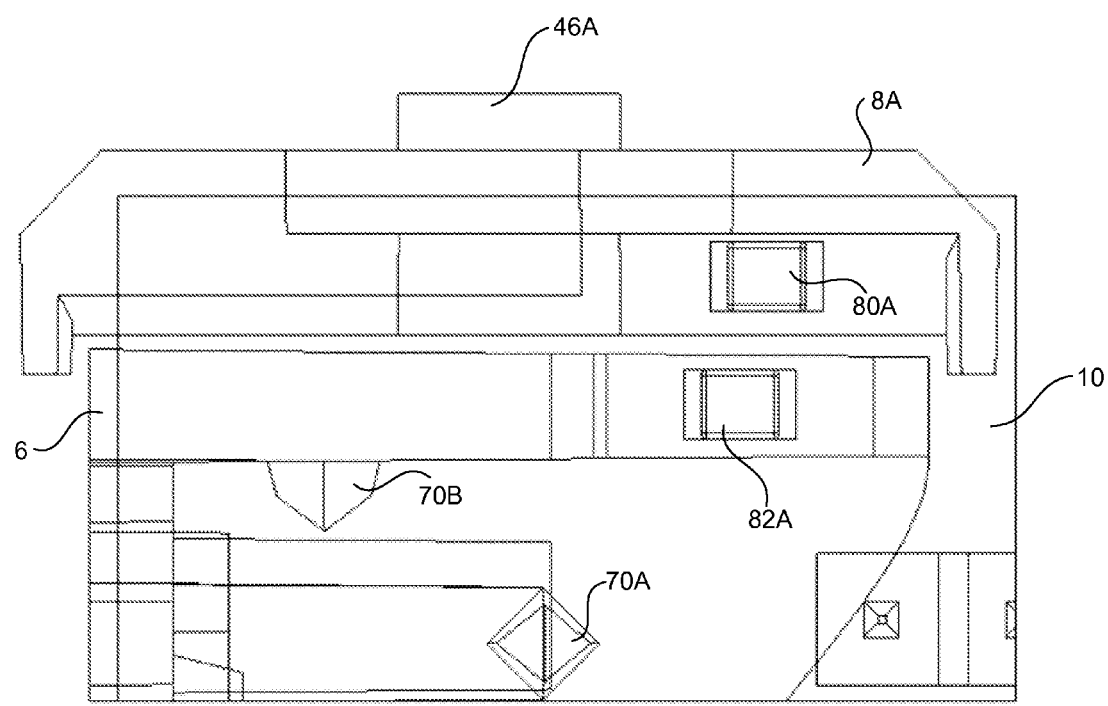
FIG. 15 is a cross-sectional view showing a disk drive backplane, a disk drive carrier, and disk drive carrier rails as provided in one implementation described herein.

FIGS. 14 and 15 are two-dimensional cross sectional views of a portion of the disk drive backplane 10, the disk drive carrier 6, and the disk drive carrier rail 8A as provided in one implementation described herein. As shown in FIGS. 14 and 15, and described above with respect to FIG. 12, light 100A emanating from a locate LED 80A is transmitted through the disk drive carrier rail 8A and observable at the front of the disk drive cage 4. Similarly, light 100B emanating from an activity LED 82A is transmitted through the disk drive carrier 6 and is observable at the front of the disk drive cage 4.

Figure 16:
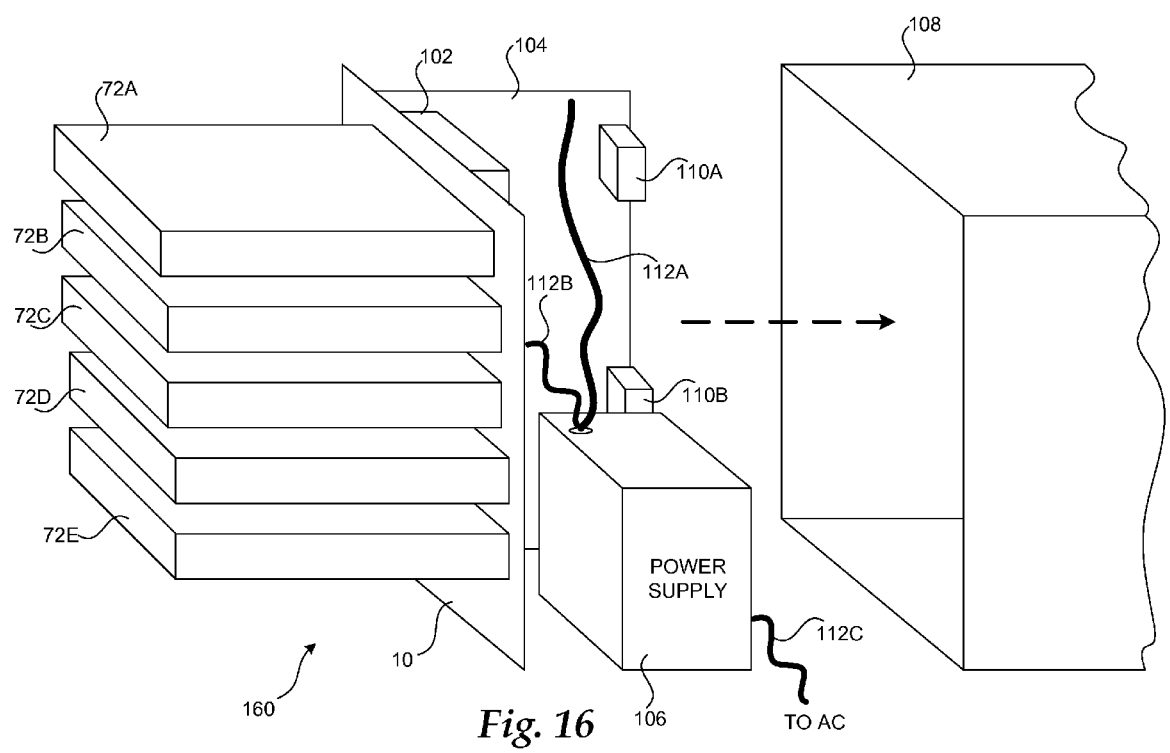
FIGS. 16 and 17 are views of one embodiment presented herein wherein the disk drive carrier cage is mounted within an external enclosure along with a disk drive controller and a power supply.

FIG. 16 illustrates a system 160 provided in another embodiment of the invention. In this embodiment, the disk drive carrier cage 4 (not shown in FIG. 16) and the disk drive backplane 10 are mounted within an external enclosure 108. Through the use of an enclosure 108 in the manner described herein, disk drives 72A-72E connected to the disk drive backplane 10 can be connected to a host computer through the use of an external host bus connection. Additional details regarding the system 160 are provided below.

In the system 160 shown in FIG. 16, the disk drive backplane 10 and the disk drive carrier cage 4 are mounted within the enclosure 108. In this implementation, the system 160 further includes a disk drive controller 104. The disk drive controller 104 is connected to the disk drive backplane 10 and provides an interface to a host computer. In particular, in one implementation, the disk drive backplane 10 provides a PCIe disk drive interface for connecting the disk drives 72A-72E to a host computer. Other suitable external data transfer interfaces such as USB or FIREWIRE may also be utilized. The disk drive controller 104 may include the connectors 110A-110B for connecting suitable cables between the controller 104 and a host computer. Additional details regarding the disk drive controller 104 are provided below with respect to FIG. 18.

As also shown in FIG. 16, the system 160 includes a power supply 106. The power supply 106 is operative to receive alternating current from a wall source and to generate and provide direct current to the hard disk drives 72A-72E, the disk drive backplane 10, the hard disk controller 104, and the fans 102. The power supply 106 is shown in FIG. 16 as being mounted within the enclosure 108. However, in other embodiments the power supply 106 may be located outside the enclosure 108. The power supply 106 is connected to the disk drive backplane 10, the disk drive controller 104, and the wall power source through the use of the wires 112B, 112A, and 112C, respectively. Other types of connectors or headers may be utilized to supply power from the power supply 106 to the various components.

In the embodiment shown in FIG. 16, five hard disk drives 72A-72E are positioned in a vertical orientation on the hard disk drive backplane 10. It should be appreciated, however, that the system 160 may utilize more or fewer hard disk drives than shown in FIG. 16 and that the hard disk drives may be positioned in a vertical or horizontal orientation. Additionally, hard disk drives having different form factors may also be utilized. For instance, the system 160 may utilize 2.5 inch, 3.5 inch, or larger hard disk drives.

Figure 17:
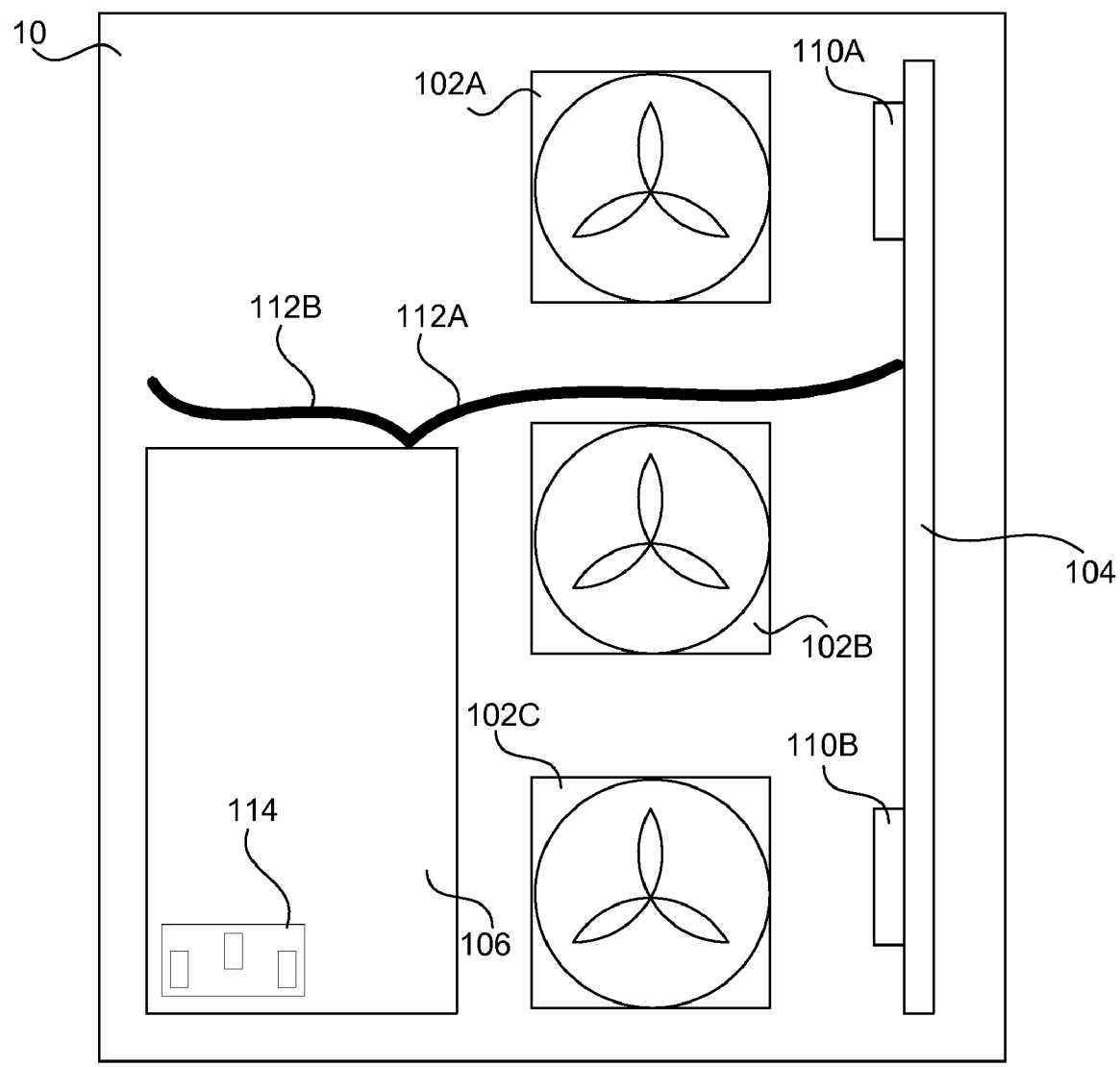

FIG. 17 is a rear view of the disk drive backplane 10 and the disk drive controller 104. As shown in FIG. 17, one or more fans 102A-102B may be mounted on the disk drive carrier cage 4. The fans 102A-102B provide airflow to assist with the cooling of the hard disk drives 72-72E and the other components mounted within the enclosure 108. The power supply 106 also includes a power input connector 114 for receiving power a cord connected to an alternating current wall source.

The connectors 110A-110B and the power input connector 114 are exposed through apertures in a rear portion of the enclosure 108, thereby providing access to these connectors. The front of the disk drive carrier cage 4 is exposed through the front of the enclosure 108 thereby allowing the hard disk drives to be inserted and removed from the enclosure 108 in a similar manner as that described above with respect to the internal use of the disk drive carrier cage 4.

Figure 18:
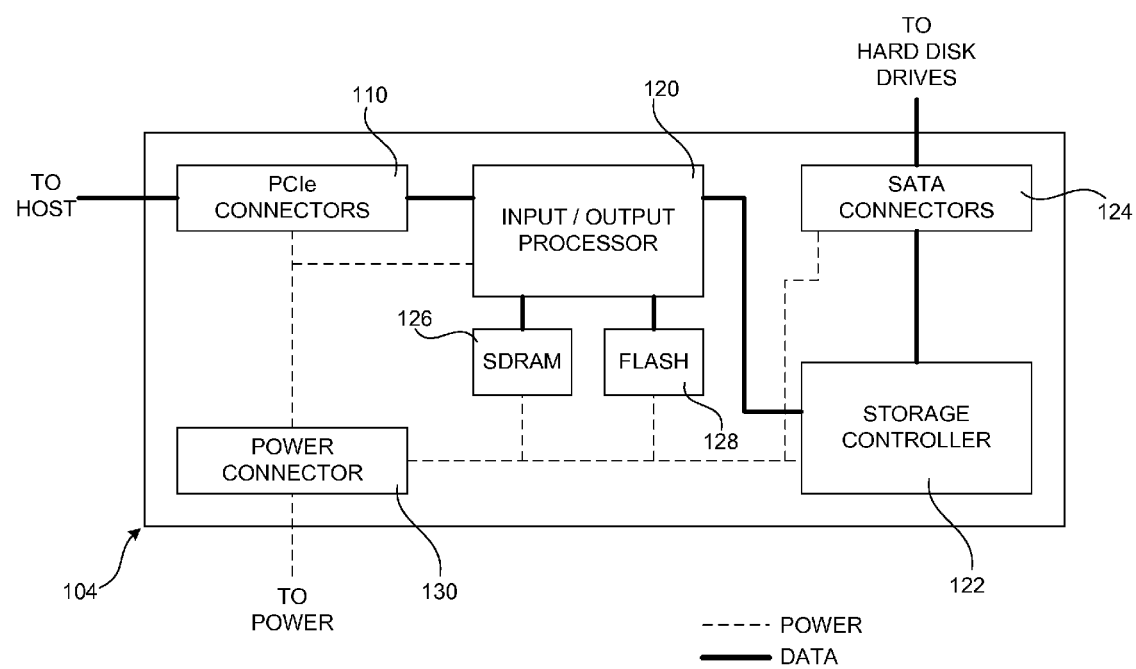
FIG. 18 is a functional block diagram showing the architecture of a disk drive controller utilized in one embodiment wherein the disk drive carrier cage is mounted within an external enclosure.

FIG. 18 shows one illustrative computing architecture for the disk drive controller 104. In particular, in one implementation, the disk drive controller 104 includes an input/output processor 120, a storage controller 122, synchronous dynamic random access memory ("SDRAM") 126, and non-volatile storage, such as the flash memory 128. These discrete components may be provided by a single integrated circuit, such as the INTEL IOC 340I/O Controller from INTEL CORPORATION. The disk drive controller 104 may be operative to provide redundant array of inexpensive disk ("RAID") functionality in one implementation.

In an illustrative embodiment, the storage controller supports the use of SATA mass storage devices and utilizes appropriate SATA connectors 124 for connection to the disk drive backplane 10. Appropriate PCIe connectors 110 are provided for connection to the host computer system. A power connector 130 may also be provided for receiving direct current power. The power is appropriately routed to the various components on the disk drive controller 104.

It should be appreciated that the embodiments described herein provide systems and apparatuses for removably mounting hard disk drives within a computer system or within an external enclosure. It should be understood that the invention defined in the appended claims is not necessarily limited to the specific structures, acts or media described herein. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for connecting one or more hard disk drives to a computer, the system comprising:
 a disk drive carrier cage configured for removably mounting a disk drive backplane and a plurality of disk drive carrier rails;
 a disk drive backplane mounted within the disk drive carrier cage, the disk drive backplane comprising a plurality of disk drive connectors for interfacing with corresponding connectors on hard disk drives removably mounted along the disk drive carrier rails in disk drive carriers, the disk drive backplane further comprising a plurality of first status indicator lights, each of the first status indicator lights corresponding to and located adjacent to a disk drive connector;
 a disk drive carrier for receiving a hard disk drive and configured for mounting within the disk drive carrier cage along the disk drive carrier rails, the disk drive carrier constructed from a light transmissive material and having a top, bottom, and side, and wherein light emitted from a first status indicator light on the backplane is transmitted through the top of the disk drive carrier from the backplane to the front of the disk drive carrier when a disk drive carrier is inserted into the disk drive carrier cage;
 a disk drive controller connected to the disk drive backplane and operative to provide a disk drive interface between the disk drive backplane and the computer;
 a power supply for providing power to the disk drive backplane, the disk drive controller, and one or more hard disk drives connected to the disk drive backplane; and
 an enclosure encasing the disk drive carrier cage, the disk drive backplane, the disk drive carrier, the disk drive controller, and the power supply.

2. The system of claim 1, wherein the disk drive interface comprises a peripheral component interconnect (PCI) express interface.

3. The system of claim 1, wherein the disk drive interface comprises a universal serial bus (USB) interface.

4. The system of claim 1, wherein the disk drive interface comprises a FIREWIRE interface.

5. The system of claim 1, wherein the disk drive backplane further comprises a plurality of second status indicator lights, each second status indicator light corresponding to and located adjacent to a disk drive connector, and wherein when a disk drive carrier is inserted into the disk drive carrier cage, light emitted from a second status indicator light on the backplane is transmitted from the backplane to the front of the disk drive carrier through the bottom of the disk drive carrier.

6. The system of claim 5, wherein the backplane further comprises a plurality of third status indicator lights, each third status indicator light corresponding to and located adjacent to a drive connector, and wherein the system further comprises:
 a plurality of disk drive carrier rails removably mountable along a top or bottom of the disk drive carrier cage, the disk drive carrier rails constructed from a light transmissive material and having a front and back, and wherein when installed along the top of the disk drive carrier cage the back of each disk drive carrier rail is positioned substantially adjacent to a third status indicator light thereby permitting light emitted from the third status indicator light to be transmitted from the back to the front of the disk drive carrier rail.

7. The system of claim 6, wherein the backplane further comprises a plurality of fourth status indicator lights, each fourth status indicator light corresponding to and located adjacent to a drive connector, and wherein when installed along the bottom of the disk drive carrier cage the back of each disk drive carrier rail is positioned substantially adjacent to a fourth status indicator light thereby permitting light emitted from the fourth status indicator light to be transmitted from the back to the front of the disk drive carrier rail.

8. The system of claim 7, wherein the disk drive backplane comprises a front side on which the disk drive connectors are mounted and a back side having one or more ports mounted thereon, wherein the disk drive carrier cage further comprises a top, bottom, rear, first side, and second side, the rear of the disk drive carrier cage being configured to receive the back side of the disk drive backplane and comprising one or more apertures corresponding to the ports of the disk drive backplane through which the ports can protrude when the disk drive backplane is installed in the disk drive carrier cage.

9. The system of claim 8, wherein the ports mounted on the back side of the disk drive backplane further comprise two power input ports for receiving power from the power supply, and wherein the power input ports are electrically connected to the disk drive connectors.

10. The system of claim 9, wherein the rear of the disk drive carrier cage is further adapted for mounting one or more fans and further includes one or more apertures through which airflow generated by the fans may circulate, the ports mounted on the back of the disk drive backplane further comprising a fan power output port for supplying power to the one or more fans.

11. The system of claim 10, wherein the ports mounted on the back side of the disk drive backplane further comprise one or more global indicator output ports for driving one or more indicator lights when any disk drive connected to the disk drive backplane is active or has failed.

12. The system of claim 11, wherein the disk drive connectors comprise serial attached SCSI (SAS) connectors.

13. The system of claim 12, wherein the disk drive carriers and disk drive carrier rails are constructed from translucent polycarbonate ABS plastic or acrylic polymer.

14. The system of claim 13, wherein the disk drive carrier cage is constructed from a single piece of metal.

15. The system of claim 14, wherein each disk drive carrier further comprises a first latching member which when positioned in a latched position protrudes through an aperture in the top of the drive carrier cage and a second latching member which when positioned in a latched position protrudes through an aperture in the bottom of the drive carrier cage thereby locking the disk drive carrier into the drive carrier cage, and wherein when the first and second latching members are positioned in an unlatched position the disk drive carrier may be slidably inserted or removed along the disk drive carrier rails mounted within the drive carrier cage.

16. The system of claim 15, wherein each disk drive carrier further comprises two or more locking nubs positioned on the top, bottom, or side of each disk drive carrier, the locking nubs being positioned at locations corresponding to the locations of mounting screw holes of a disk drive when the disk drive is inserted into the disk drive carrier.

17. The system of claim 16, wherein the disk drive carrier cage further comprises a locking tab and two locking apertures corresponding to each disk drive connector on the disk drive backplane, and wherein each disk drive carrier rail further comprises an aperture for receiving the locking tab and two locking protrusions adapted for insertion into the locking apertures when the disk drive carrier rail is attached to the disk drive carrier cage.

18. The system of claim 17, wherein the latching members are spring loaded.

19. The system of claim 18, wherein the disk drive carrier rails are configured for installation along either the top or bottom of the disk drive carrier cage.

20. The system of claim 19, wherein the latching members are configured for installation on either the top or bottom of a disk drive carrier.

\* \* \* \* \*